(12) United States Patent
Sakurada

(10) Patent No.: US 11,433,909 B2
(45) Date of Patent: Sep. 6, 2022

(54) WIND DATA ESTIMATING APPARATUS

(71) Applicant: TOYOTA JIDOSHA KABUSHIKI KAISHA, Toyota (JP)

(72) Inventor: Shin Sakurada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 187 days.

(21) Appl. No.: 16/456,447

(22) Filed: Jun. 28, 2019

(65) Prior Publication Data

US 2020/0017112 A1 Jan. 16, 2020

(30) Foreign Application Priority Data

Jul. 11, 2018 (JP) .............................. JP2018-131837

(51) Int. Cl.
*B60W 40/107* (2012.01)
*B60W 50/08* (2020.01)

(52) U.S. Cl.
CPC .......... *B60W 40/107* (2013.01); *B60W 50/08* (2013.01); *B60W 2520/06* (2013.01); *B60W 2520/105* (2013.01); *B60W 2540/10* (2013.01); *B60W 2552/00* (2020.02); *B60W 2555/20* (2020.02)

(58) Field of Classification Search
CPC ............... B60W 40/107; B60W 50/08; B60W 2552/00; B60W 2555/20; B60W 2520/06; B60W 2520/105; B60W 2540/10
USPC .......................................................... 701/70
See application file for complete search history.

(56) References Cited

U.S. PATENT DOCUMENTS

| 2015/0166073 A1* | 6/2015 | D'Amato ............ B60W 40/076 701/1 |
| 2016/0082964 A1* | 3/2016 | Chunodkar ........... B60W 40/13 701/70 |
| 2016/0176309 A1* | 6/2016 | Jeon ........................ B60L 58/12 701/22 |

(Continued)

FOREIGN PATENT DOCUMENTS

| JP | 2015-093618 | 5/2015 |
| JP | 2017-224107 | 12/2017 |

OTHER PUBLICATIONS

Climatic Wind Data for the United States, Nov. 1998, National Climatic Data Center (Year: 1998).*

(Continued)

*Primary Examiner* — Elaine Gort
*Assistant Examiner* — Matthias S Weisfeld
(74) *Attorney, Agent, or Firm* — Finnegan, Henderson, Farabow, Garrett & Dunner, LLP

(57) ABSTRACT

A wind data estimating apparatus includes one or more processors configured to collect vehicle information including a first acceleration, an amount of driving operation performed by a driver of a vehicle, and position information, which are obtained by sensors installed in the vehicle; classify the collected vehicle information by an area of a plurality of areas according to the position information; and estimate a wind velocity and a wind direction for the area and for a time range when the vehicle information is obtained, on the basis of an acceleration obtained from subtracting a second acceleration caused by the amount of driving operation from the first acceleration included in the vehicle information classified by the area.

16 Claims, 10 Drawing Sheets

(56) References Cited

U.S. PATENT DOCUMENTS

2017/0361834 A1* 12/2017 Pas ...................... B60W 10/16
2018/0089998 A1*  3/2018 Masuda ................. G08G 1/065
2018/0157273 A1*  6/2018 Wegend ........... G08G 1/096775
2018/0162400 A1*  6/2018 Abdar .................. G08G 1/0112

OTHER PUBLICATIONS

U.S. Wind Climatology, Mar. 9, 2015, National Centers for Environmental Information (Year: 2015).*

Average Wind Speeds—Map Viewer, Apr. 9, 2015, Climate.gov (Year: 2015).*

* cited by examiner

FIG.5A

VEHICLE ID=001

| AREA | TIME RANGE | VEHICLE INFORMATION |
|---|---|---|
| 1 | 1 | 001 |
| 1 | 1 | 002 |
| ⋮ | ⋮ | ⋮ |
| 1 | 2 | 001 |
| 1 | 2 | 002 |
| ⋮ | ⋮ | ⋮ |

FIG.5B

VEHICLE ID=002

| AREA | TIME RANGE | VEHICLE INFORMATION |
|---|---|---|
| 1 | 1 | 001 |
| 1 | 1 | 002 |
| ⋮ | ⋮ | ⋮ |
| 1 | 2 | 001 |
| 1 | 2 | 002 |
| ⋮ | ⋮ | ⋮ |

| AREA | TIME RANGE | AVERAGE VALUE $V_{WGm}$ (m) OF GROUND-BASIS WIND VELOCITIES | AVERAGE VALUE $\theta_m$ (DEGREES) OF WIND DIRECTIONS |
|---|---|---|---|
| 1 | 1 | 20 | 45 |
| 1 | 2 | 25 | 45 |
| ... | ... | ... | ... |
| 2 | 1 | 20 | 45 |
| 2 | 2 | 25 | 45 |
| ... | ... | ... | ... |

WIND DATA ESTIMATING APPARATUS

BACKGROUND OF THE INVENTION

1. Field of the Invention

The present invention relates to a wind data estimating apparatus.

2. Description of the Related Art

According to a related art, a wind detecting apparatus device that detects presence or absence of wind received by a mobile body includes a unit calculating the absolute value of a yaw rate, the absolute value of a roll angle, the absolute value of a vertical acceleration, and the absolute value of a lateral acceleration; and a unit determining that a crosswind is present when all of the calculated absolute values exceed corresponding predetermined threshold values (for example, see Japanese Laid-Open Patent Application No. 2015-093618).

SUMMARY OF THE INVENTION

According to an embodiment, a wind data estimating apparatus includes one or more processors configured to collect vehicle information including a first acceleration, an amount of driving operation performed by a driver of a vehicle, and position information, which are detected by sensors installed in the vehicle; classify the collected vehicle information by an area of a plurality of areas according to the position information; and estimate a wind velocity and a wind direction for the area and for a time range when the vehicle information is obtained, on the basis of an acceleration obtained from subtracting a second acceleration caused by the amount of driving operation from the first acceleration included in the vehicle information classified by the area.

Other objects, features and advantages of the present invention will become more apparent from the following detailed description when read in conjunction with the accompanying drawings.

BRIEF DESCRIPTION OF THE DRAWINGS

FIGS. 5A and 5B illustrate a data structure of a vehicle information database;

FIG. 13 illustrates a wind database calculated by the wind data estimating apparatus 100.

DETAILED DESCRIPTION OF THE EMBODIMENTS

Figure 1:
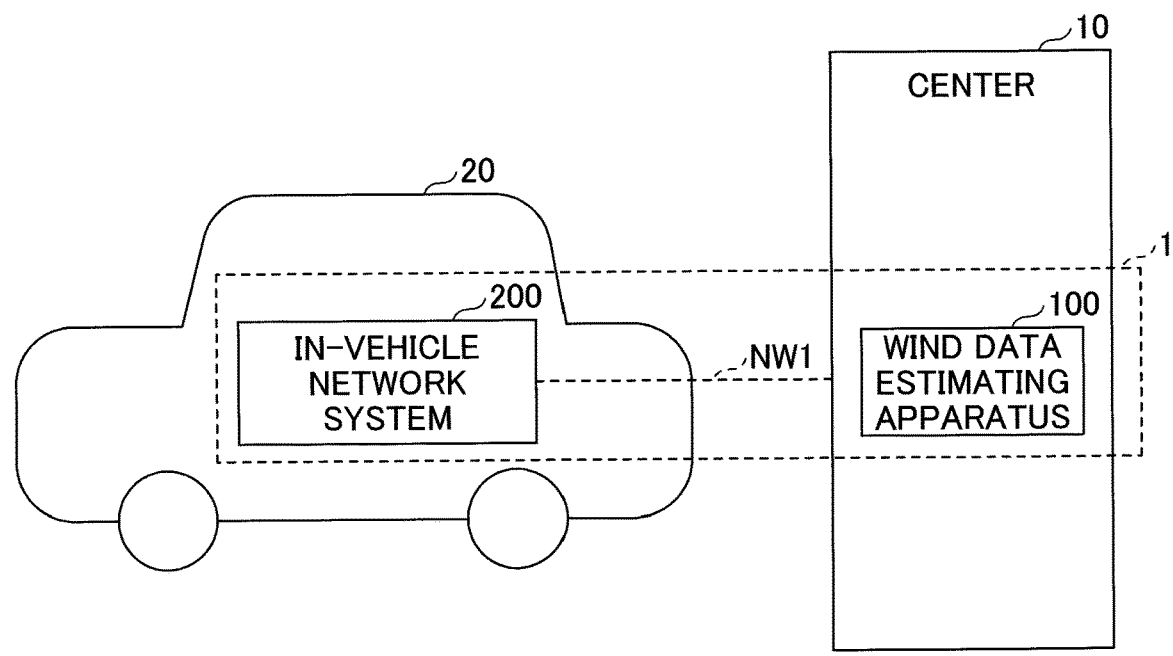
FIG. 1 illustrates an example of a configuration of a wind data estimating system 1 including a wind data estimating apparatus 100 according to an embodiment.

The wind detecting apparatus according to the related art uses the absolute value of a yaw rate, the absolute value of a roll angle, the absolute value of a vertical acceleration, and the absolute value of a lateral acceleration calculated from detection values of the wind detecting apparatus installed in a vehicle to determine presence of a crosswind. However, the wind detecting apparatus cannot quantify a wind velocity and a wind direction. Data of a wind velocity and a wind direction can be used for an analysis for an influence of the wind on the vehicle in more detail.

An object of an embodiment is to provide a wind data estimating apparatus capable of estimating data concerning wind received by a vehicle.

A wind data estimating apparatus according to the embodiment of the present invention includes one or more processors configured to collect vehicle intonation including a first acceleration, an amount of driving operation performed by a driver of a vehicle, and position information, which are obtained by sensors installed in the vehicle; classify the collected vehicle information by an area of a plurality of areas according to the position information; and estimate a wind velocity and a wind direction for the area and for a time range when the vehicle information is obtained, on the basis of an acceleration obtained from subtracting a second acceleration caused by the amount of driving operation from the first acceleration included in the vehicle information classified by the area.

Thus, a wind velocity and a wind direction can be estimated on the basis of an acceleration obtained by subtracting an acceleration (a second acceleration) caused by a driving operation from an acceleration (a first acceleration) of a vehicle detected by a sensor.

Thus, it is possible to provide a wind data estimating apparatus 100 capable of estimating data concerning wind received by a vehicle.

In the wind data estimating apparatus according to the embodiment of the present invention, the amount of driving operation performed by the driver of the vehicle may be an accelerator position, a brake operation amount (an amount of brake operation), a vehicle velocity, or a steering angle detected by a corresponding sensor of the sensors installed in the vehicle.

Thus, it is possible to eliminate an influence of a second acceleration occurring in a vehicle due to an accelerator position, a brake operation amount, a vehicle velocity, or a steering angle.

Thus, it is possible to provide a wind data estimating apparatus capable of estimating wind received by a vehicle taking into account of a second acceleration occurring in a vehicle due to an accelerator position, a brake operation amount, a vehicle velocity, or a steering angle.

In the above-mentioned wind data estimating apparatus according to the embodiment of the present invention, the one or more processors may be configured to estimate the wind velocity and the wind direction of the area and the time range on the basis of an acceleration obtained from subtracting, from the first acceleration, the second acceleration and a third acceleration of the vehicle caused by a cross-grade or a grade of a road corresponding to the position information.

Thus, it is possible to eliminate an influence of a third acceleration occurring in a vehicle due the cross-grade or the grade of a road.

Thus, it is possible to provide a wind data estimating apparatus capable of estimating data concerning wind received by a vehicle taking into account of a third acceleration that occurs in the vehicle due to the cross-grade or the grade of a road.

In the wind data estimation apparatus according to the embodiment of the present invention, the one or more processors may be configured to collect respective sets of vehicle information from a plurality of vehicles; classify the collected sets of vehicle information by respective areas from among the plurality of areas in accordance with corresponding sets of position information; and estimate the wind velocity and the wind direction of the area on the basis of a plurality of wind velocities and a plurality of wind directions estimated from corresponding sets of vehicle information obtained during the same time range from among a plurality of sets of vehicle information classified by the same area.

Thus, a wind velocity and a wind direction can be estimated on the basis of vehicle information of a plurality of vehicles, allowing for more accurate estimation.

Thus, by estimating a wind velocity and a wind direction on the basis of vehicle information of a plurality of vehicles, a wind data estimating apparatus 100 can be provided that can estimate data concerning wind received by a vehicle with higher accuracy.

In the wind data estimating apparatus according to the embodiment of the present invention, the one or more processors may be configured to estimate the plurality of wind velocities and the plurality of wind directions from the corresponding sets of vehicle information of the same area and the same time range, on the basis of accelerations obtained from subtracting, from first accelerations, second accelerations and third accelerations that occur in the vehicles due to cross-grades or grades of roads associated with corresponding sets of position information, respectively.

Thus, wind velocities and wind directions can be estimated on the basis of vehicle information of a plurality of vehicles, taking into account of third accelerations that occur in the vehicles due to the cross-grades or grades of roads.

Thus, it is possible to provide a wind data estimating apparatus that can estimate wind velocities and wind directions on the basis of vehicle information of a plurality of vehicles taking into account of third accelerations that occur in the vehicle due to the cross-grades or the grades of roads, thereby estimating data concerning wind received by a vehicle more accurately.

In the wind data estimating apparatus according to the embodiment of the present invention, the one or more processors may be configured to obtain, from the estimated wind velocity and wind direction and a vehicle velocity of the vehicle, a wind velocity and a wind direction in a ground coordinate system with respect to a traveling direction of the vehicle.

Thus, it is possible to obtain estimates of a wind velocity and a wind direction expressed as a wind velocity and a wind direction in a ground coordinate system.

Thus, it is possible to provide a wind data estimating apparatus that can estimate data concerning wind received by a vehicle with higher accuracy by using estimates of a wind velocity and a wind direction in a ground coordinate system.

Thus, a wind data estimating apparatus capable of estimating data concerning wind received by a vehicle can be provided.

Hereinafter, an embodiment of a wind data estimating apparatus according to the present invention will be described.

EMBODIMENT

FIG. 1 illustrates an example of a configuration of a wind data estimating system 1 including a wind data estimating apparatus 100 according to an embodiment.

The wind data estimating system 1 includes a wind data estimating apparatus 100 of a center 10 and an in-vehicle network system 200 installed in a vehicle 20. The center 10 stores data indicating an identifier of the vehicle 20.

The in-vehicle network system 200 and the center 10 can perform communication together through a predetermined communication network NW1 that may be a mobile communication network or the Internet, i.e., a wireless communication network connected to a plurality of base stations at respective ends. In FIG. 1, for convenience, the single in-vehicle network system 200 is illustrated. However, it is possible that in-vehicle network systems 200 of a plurality of vehicles 20 perform communication with the center 10 through the network NW1.

The vehicle 20 is, for example, a HV (Hybrid Vehicle), a PHV (Plug-in Hybrid Vehicle), an EV (Electric Vehicle), a gasoline vehicle, a diesel vehicle, or the like, and includes the in-vehicle network system 200.

The in-vehicle network system 200 has an information processing function and a communication function. The in-vehicle network system 200 transmits vehicle information of the vehicle 20 to the center 10. Vehicle information includes data indicating at least an accelerator position, a vehicle velocity, accelerations, a steering angle, a yaw rate, a brake operation amount, and a position of a vehicle 20.

Data indicating a position is data indicating the current position of a vehicle 20 at a certain point of time and is provided by a GPS (Global Positioning System). Time information indicating a time at which vehicle information is obtained is associated with the vehicle information.

Vehicle information is stored in a data area such as a frame of data that is transmitted between a DCM 203 (see FIG. 3) and the center 10.

The center 10 includes one or more computers (information processing apparatuses). The center 10 is a data center that receives vehicle information from respective in-vehicle network systems 200 of a plurality of vehicles 20. Each vehicle 20 is assigned a unique ID (a vehicle ID) and vehicle information transmitted from each vehicle 20 to the center 10 is associated with the corresponding vehicle ID.

The center 10 includes a wind data estimating apparatus 100. Below, a configuration where the wind data estimating apparatus 100 corresponds to some of functions of the center 10 will be described. In addition to the functions of the wind data estimating apparatus 100, the center 10 has functions to provide traffic information and route guidance or to provide services through various applications to the in-vehicle network system 200 of the vehicles 20, for example.

The wind data estimating apparatus 100 estimates wind data such as a wind direction and a wind velocity of a predetermined time range for an area where a plurality of vehicles 20 travel, on the basis of vehicle information transmitted from the in-vehicle network systems 200 of the plurality of vehicles 20 and received by the center 10.

The configuration where the wind data estimating apparatus 100 corresponds to some of the functions of the center 10 will now be described. However, such a configuration need not be applied, and, for example, the wind data estimating apparatus 100 may be provided as a dedicated center for estimating wind data.

Figure 2:
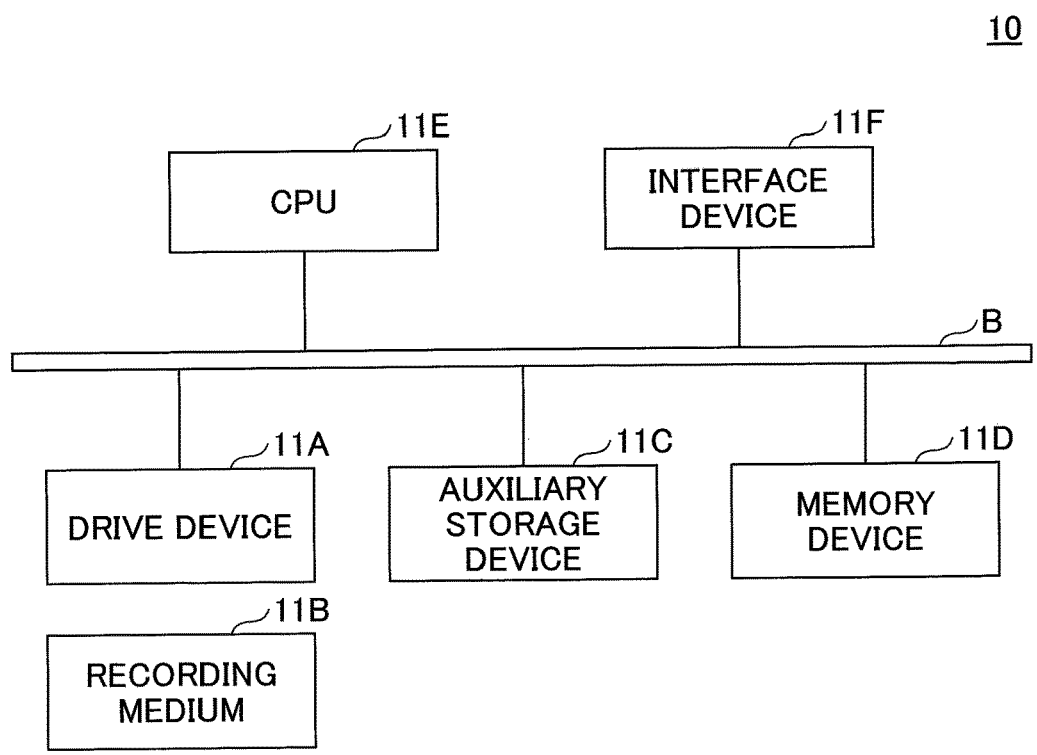
FIG. 2 illustrates an example of a hardware configuration of a center 10 according to an embodiment.

FIG. 2 illustrates an example of a hardware configuration of the center 10 according to the embodiment. The center 10 of FIG. 2 includes a drive device 11A, an auxiliary storage device 11C, a memory device 11D, a CPU 11E, and an interface device 11F, each of these devices being interconnected by a bus B.

A program that implements processing of the center 10 is provided by a recording medium 11B, such as a CD-ROM. After the recording medium 11B storing the program is set in the drive device 11A, the program is installed from the recording medium 11B to the auxiliary storage device 11C via the drive device 11A. However, it is not necessary to install the program from the recording medium 11B; the program may be downloaded from another computer via the network. The auxiliary storage device 11C stores the installed program and stores necessary files, data, and so forth.

The memory device 11D reads the program from the auxiliary storage device 11C and stores the program, in response to receiving a program startup instruction. The CPU 11E executes the functions of the center 10 according to the program stored in the memory device 11D. The interface device 11F is used to connect to a network.

A recording medium that stores a wind data estimation program may be any one of the recording medium 11B, the auxiliary storage device 11C, and the memory device 11D. The recording medium 11B, the auxiliary storage device 11C, and the memory device 11D are each non-transitory recording media.

Figure 3:
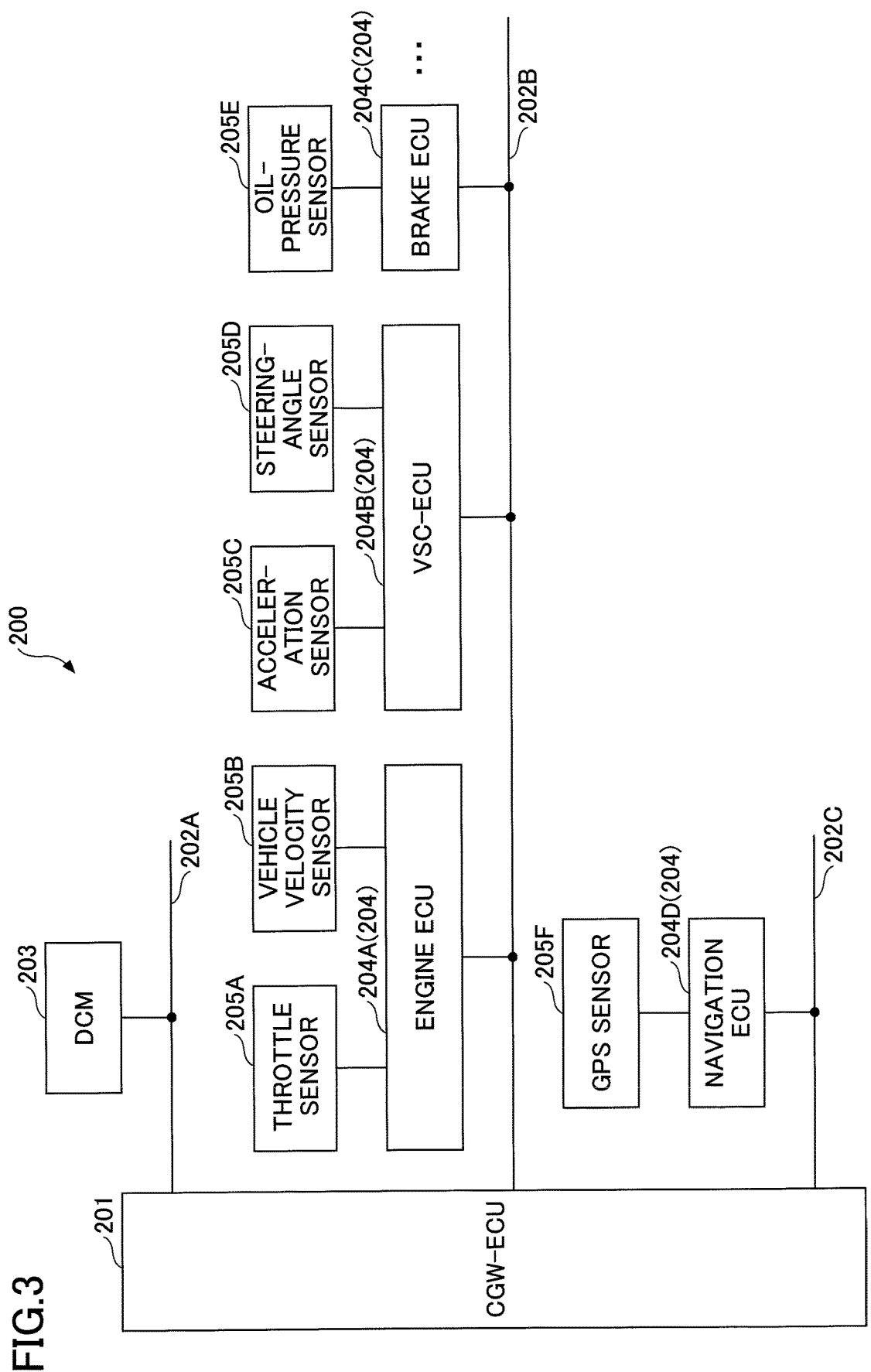
FIG. 3 illustrates an in-vehicle network system 200.

FIG. 3 illustrates the in-vehicle network system 200. The in-vehicle network system 200 includes a CGW (Central Gateway)-ECU (Electronic Control Unit) 201, buses 202A, 202B, and 202C, the DCM (Data Communication Module) 203, and a plurality of ECUs 204.

As the plurality of ECUs 204, FIG. 3 illustrates an engine ECU 204A, a VSC (Vehicle Stability Control)-ECU 204B, a brake ECU 204C, and a navigation ECU 204D from among various ECUs installed in the vehicle 20.

The in-vehicle network system 200 also includes other ECUs (not illustrated) in addition to the engine ECU 204A, the VSC-ECU 204B, the brake ECU 204C, and the navigation ECU 204D. When the engine ECU 204A, the VSC-ECU 204B, the brake ECU 204C, and the navigation ECU 204D are not particularly specifically distinguished thereamong, they will be simply referred to as ECUs 204.

The engine ECU 204A is connected with a throttle sensor 205A and a vehicle velocity sensor 205B, the VSC-ECU 204B is connected with an acceleration sensor 205C and a steering-angle sensor 205D, and the brake ECU 204C is connected with an oil-pressure sensor 205E. The GPS sensor 205F is connected to the navigation ECU 204D.

A vehicle 20 includes various sensors (not illustrated) in addition to the throttle sensor 205A, the vehicle velocity sensor 205B, the acceleration sensor 205C, the steering-angle sensor 205D, the oil-pressure sensor 205E, and the GPS sensor 205F; the various sensors are each connected to any one of the ECUs 204 or directly connected to a bus (any one of the buses 202A, 202B, and 202C).

The above-described connection relationships where, as illustrated in FIG. 3, the throttle sensor 205A and the vehicle velocity sensor 205B are connected to the engine ECU 204A, the acceleration sensor 205C and the steering-angle sensor 205D are connected to the VSC-ECU 204B, the oil-pressure sensor 205E is connected to the brake ECU 204C, and the GPS sensor 205F is connected to the navigation ECU 204D, need not be applied as they are. Here, the case having the connection relationships illustrated in FIG. 3 will be described.

Each of the CGW-ECU 201 and the plurality of ECUs 204 is implemented by a computer including, for example, a CPU (Central Processing Unit), a RAM (Random Access Memory), a ROM (Read-Only Memory), a clock generator, an I/O interface, a communication interface, a transmitting and receiving unit, an internal bus, and so forth.

The in-vehicle network system 200 is installed in the vehicle 20, where the ECUs 204 perform communication thereamong. The in-vehicle network system 200 obtains vehicle information, transmitted through buses 202A, 202B, and 202C at a predetermined sampling rate, and transmits the vehicle information to the center 10 via the DCM 203 every predetermined time interval (e.g., every 8 minutes). The predetermined sampling rate is, for example, 100 ms (milliseconds).

The CGW-ECU 201 relays vehicle information among the buses 202A, 202B, and 202C.

The buses 202A, 202B, and 202C are used for data communication according to an Ethernet (registered trademark) protocol. The buses 202A, 202B, and 202C may also be buses for data communication according to a CAN (controller area network) protocol.

The DCM 203 is connected to the bus 202A. The bus 202B is connected to the engine ECU 204A, the VSC-ECU 204B, and the brake ECU 204C. The bus 202C is connected with the navigation ECU 204D. The buses 202A, 202B, and 202C may be connected with other ECUs and sensors (not illustrated) in addition to the DCM 203, the engine ECU 204A, the VSC-ECU 204B, the brake ECU 204C, and the navigation ECU 204D.

The DCM 203 is an example of an in-vehicle wireless communication device. For example, the DCM 203 performs wireless communication via a communication line such as a communication line of 3G (Third Generation), 4G (Fourth Generation), LTE (Long Term Evolution), or 5G (Fifth Generation). The DCM 203 includes a communication terminal and a dedicated ECU. Accordingly, the DCM 203 may be also treated as a type of ECU.

An ID (identification) is allocated to each ECU 204. Which one of the ECUs 204 is a destination of data transmitted is determined from an ID included in the data.

The engine ECU 204A controls the output of an engine on the basis of the accelerator position and the vehicle velocity detected by the throttle sensor 205A and the vehicle velocity sensor 205B, respectively. In a case of a HV (Hybrid Vehicle) or a case of an EV (Electric Vehicle), a HV-ECU controlling the output of the engine and controlling the output of the driving motor, or an EV-ECU controlling the output of the driving motor may be used instead of the engine ECU 204A. In this regard, the accelerator position may be detected by an accelerator position sensor.

The VSC-ECU 204B performs control to stabilize the behavior of a vehicle 20 on the basis of the accelerations (the forward/backward acceleration and the lateral acceleration) and the yaw rate of the vehicle 20 detected by the acceleration sensor 205C and the steering angle detected by the steering-angle sensor 205D. The acceleration sensor 205C is a three-axis sensor that detects the forward/backward acceleration, the lateral acceleration, and the yaw rate.

The brake ECU 204C performs control to implement an ABS (Anti-lock Brake System) function and a VSC (Vehicle Stability Control) function on the basis of, for example, the oil pressure detected by the oil-pressure sensor 205E provided in the master cylinder. The oil pressure detected by the oil-pressure sensor 205E indicates the amount of brake operation.

The navigation ECU 204D controls a navigation device installed in the interior of a vehicle 20. The navigation ECU 204D uses position information detected by the GPS sensor 205F to detect the current position of the vehicle 20, to search for a route to a destination, to provide route guidance, and so forth. A route search may be implemented also by the center 10. In such a case, the center 10 may search for a route; thus obtained route information may be then transmitted to the in-vehicle network device 200; and the navigation ECU 204D may perform route guidance using the transmitted route information.

The navigation device has one or more display panels; the navigation ECU 204D controls displays of the one or more display panels. The navigation ECU 204D thus displays the position of the vehicle 20, the route to the destination, and so forth, on the one or more display panels.

Data indicating the accelerator position, the vehicle velocity, the accelerations and the yaw rate, the steering angle, the oil pressure (i.e., the brake operation amount), and the position detected by the throttle sensor 205A, the vehicle velocity sensor 205B, the acceleration sensor 205C, the steering-angle sensor 205D, the oil-pressure sensor 205E, and the GPS sensor 205F, respectively, are used by the engine ECU 204A, the VSC-ECU 204B, the brake ECU 204C, and the navigation ECU 204D, and also are transmitted to various ECUs through the buses 202A, 202B, 202C.

The data thus detected by the sensors is also used to estimate wind data in the wind data estimating apparatus 100. Details will be described later.

The DCM 203 transmits vehicle information including data indicating the accelerator position, the vehicle velocity, the accelerations, the steering angle, the yaw rate, the brake operation amount, and the position from among the data transmitted by the bus 202A to the center 10 every predetermined time interval (e.g., every 8 minutes).

Figure 4:
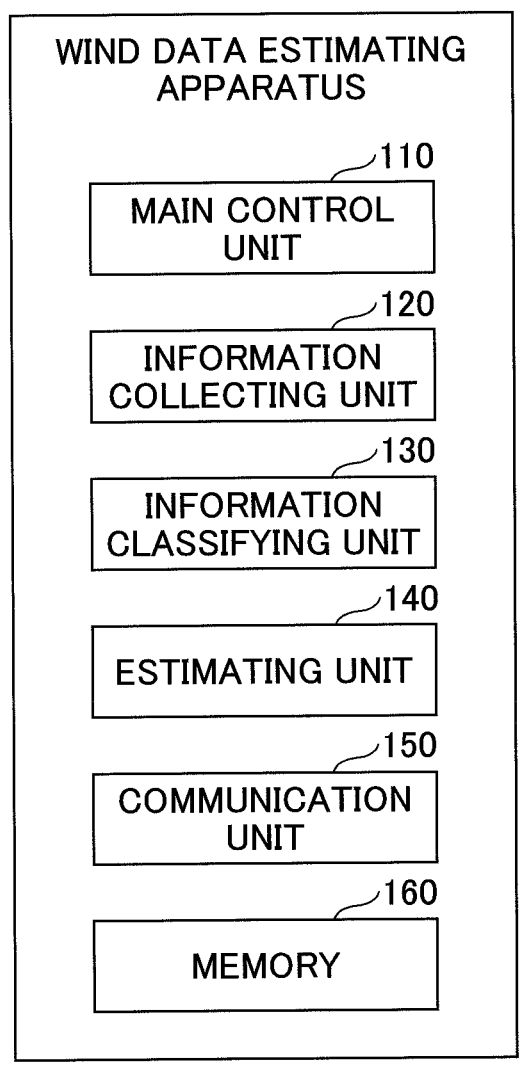
FIG. 4 illustrates a configuration of the wind data estimating apparatus 100.

FIG. 4 illustrates a configuration of the wind data estimating apparatus 100. FIGS. 5A and 5B illustrate a data structure of a vehicle information database.

The wind data estimating apparatus 100 includes a main control unit 110, an information collecting unit 120, an information classifying unit 130, an estimating unit 140, a communication unit 150, and a memory 160. The main control unit 110, the information collecting unit 120, the information classifying unit 130, the estimating unit 140, and the communication unit 150 are illustrated as functional blocks of programs (functions) executed by the wind data estimating apparatus 100. Also the memory 160 is functionally illustrated in FIG. 4.

The main control unit 110 performs overall control of processing performed by the wind data estimating apparatus 100. The main control unit 110 performs processing other than processing performed by the information collecting unit 120, the information classifying unit 130, the estimating unit 140, and the communication unit 150.

The information collecting unit 120 obtains vehicle information including data indicating the accelerator position, the vehicle velocity, the accelerations, the steering angle, the yaw rate, the brake operation amount, and the position from the in-vehicle network systems 200 of vehicles 20 via the communication unit 150 every predetermined time interval (e.g., every 8 minutes). Vehicle information is obtained at a predetermined sampling rate (e.g., at 100 ms) in each of the vehicles 20.

The information classifying unit 130 classifies the vehicle information of the vehicles 20 obtained through the information collecting unit 120 by predetermined areas and manages the vehicle information by classifying the vehicle information by time ranges. The predetermined areas are mesh-like areas each having a size of 100 m by 100 m, obtained from segmenting the whole area included in mapping data along the east-west direction and along the north-south direction. The whole area included in the mapping data is segmented and classified by the mesh-like areas each having the size of 100 m by 100 m; the respective areas are provided with unique identifiers.

The same time range means a time range that is the same among vehicles 20; during the same time range, respective sets of vehicle information are obtained by the vehicles 20. For example, the time axis is segmented from a standard time into one-minute time ranges; time points at which respective sets of vehicle information are obtained by the vehicles 20 are classified by corresponding time ranges, whereby it is possible to determine whether the respective sets of vehicle information have been obtained during the same time range.

The information classifying unit 130 identifies an area on the basis of data indicating a position included in vehicle information obtained by the information collecting unit 120, and identifies a time range on the basis of time information indicating a time when the data indicating the position is obtained, thereby classifying the vehicle information by the area and by the time range and managing the vehicle information. Each set of vehicle information is associated with an area identifier and is stored in a vehicle information database (see FIGS. 5A and 5B) of the memory 160 for each time range.

For example, as illustrated in FIGS. 5A and 5B, in the vehicle information database, sets of vehicle information obtained from a plurality of vehicles 20 are stored in association with areas and with time ranges for each vehicle ID. In FIGS. 5A and 5B, by a vehicle 20 having a vehicle ID 001, sets of vehicle information 001, 002, . . . , obtained during time ranges 1, 2, . . . , are obtained at an area 1. Vehicle information codes are assigned in an order starting from 001 for each time range. Similarly, sets of vehicle information are obtained by a vehicle 20 of a vehicle ID 002 and stored in association with areas and with time ranges. This is also applied to other vehicles 20.

The estimating unit 140 estimates a wind velocity and a wind direction for a time range and an area on the basis of the accelerations, the yaw rates, the accelerator positions, the vehicle velocities, the steering angles, the brake operation amounts, and the data indicating the positions included in the plurality of sets of vehicle information concerning the time range and the area from among the plurality of sets of vehicle information classified by a plurality of areas and by a plurality of time ranges by the information classifying unit 130. An actual method for estimating a wind velocity and a wind direction will be described later.

The communication unit 150 is a modem or the like that performs data communication with the DCMs 203 of in-vehicle network systems 200. The communication unit 150 receives vehicle information from in-vehicle network systems 200 of a plurality of vehicles 20, and transmits the received information to the information collecting unit 120.

The memory 160 stores data and programs used for a wind velocity and wind direction estimation process, and stores data generated by the estimating unit 140 when the estimation process is performed. Data generated during such an estimation process is stored in a vehicle information database described above.

An estimation method for estimating a wind velocity and a wind direction will now be described. An estimation process for a wind velocity and a wind direction that will now be described is performed by the estimating unit 140. Below, a method of estimating a wind velocity and a wind direction for a time range and an area on the basis of a plurality of sets of vehicle information concerning the time range and the area included in a vehicle information database by the estimating unit 140 will be described.

The estimating unit 140 estimates wind velocities and wind directions from data indicating the accelerations, the yaw rates, the accelerator positions, the vehicle velocities, the steering angles, the brake operation amounts, and the positions included in vehicle information, and estimates a wind velocity and a wind direction for a time range and an area by obtaining the averages of the estimated wind velocities and wind directions. The estimating unit 140 performs such a process using many sets of vehicle information.

For example, one area is a square of 100 meters by 100 meters, and one time range is a one-minute period out of every minute of every hour of a standard time. A wind velocity and a wind direction are estimated from each sample of 30 or more samples of vehicle information concerning one time range and one area; then a wind velocity and a wind direction for the one time range and the one area are estimated by calculating the average values of the estimated wind velocities and wind directions.

Figure 6:
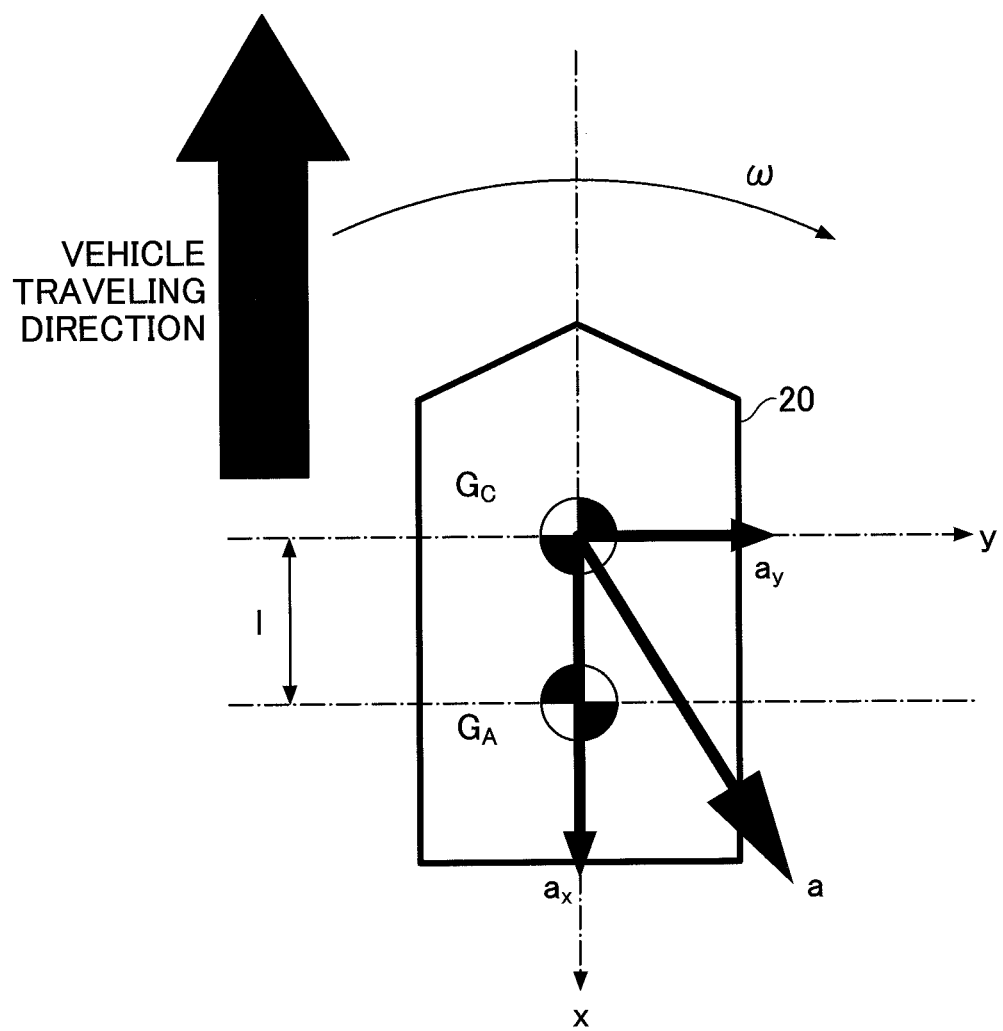
FIG. 6 illustrates an acceleration a and a yaw rate co of a vehicle 20.

FIG. 6 illustrates an acceleration a and a yaw rate ω of a vehicle 20. FIG. 6 illustrates a traveling direction of the vehicle 20 with an arrow. The vehicle 20 is indicated in a plan view; a coordinate system (a vehicle coordinate system) based on the vehicle 20 is indicated by a lowercase xy coordinate system. The x-axis corresponds to the forward and backward directions of the vehicle 20; the backward direction of the vehicle 20 corresponds to the positive direction of the x-axis. Therefore, in the example of FIG. 6, the traveling direction of the vehicle 20 is in the x-axis negative direction. The y-axis corresponds to the width directions of the vehicle 20; the rightward direction with respect to the traveling direction of the vehicle corresponds to the positive direction of the y-axis.

For FIG. 6, physical quantities and so forth will now be defined. $G_C$ denotes the center of gravity of the vehicle 20; $G_A$ denotes the center of aerodynamic force (the yaw center) of the vehicle 20. Below, $V_V$ denotes the vehicle velocity of the vehicle 20 and therefore denotes a vector.

The vector a denotes the acceleration of the vehicle 20. $a_x$ denotes the forward/backward component of the vector a; the backward direction corresponding to the positive direction. $a_y$ denotes the lateral component of the vector a; the right direction corresponds to the positive direction. The forward/backward acceleration $a_x$ and the lateral acceleration $a_y$ are two axial accelerations detected by the acceleration sensor 205C. ω denotes the yaw rate of the vehicle 20 detected by the acceleration sensor 205C; the clockwise direction in a plan view of the vehicle 20 corresponds to the positive direction. The forward/backward acceleration $a_x$ and the lateral acceleration $a_y$ are one example of a first acceleration.

Although not illustrated in FIG. 6, $F_{Vx}$ denotes a vector indicating the force exerted in a forward/backward direction of the vehicle 20; the positive direction corresponds to the backward direction. $F_{Vy}$ denotes a vector indicating the force exerted in a lateral direction of the vehicle 20; the positive direction corresponds to the right direction. $M_V$ denotes the moment (a vector quantity) generated in the vehicle 20; the counterclockwise direction corresponds to the positive direction.

m denotes the mass of the vehicle 20. I denotes the moment of inertia (a vector quantity) around the center of gravity $G_C$ of the vehicle 20.

$F_{Vx}$, $F_{Vy}$, and $M_V$ are expressed by the following equations (1) through (3), respectively.

$$F_{Vx} = m \cdot a_x \tag{1}$$

$$F_{Vy} = m \cdot a_y \tag{2}$$

$$M_V = I \cdot \omega \tag{3}$$

Although not illustrated in FIG. 6, $F_{ux}$ denotes a vector indicating the force exerted in a forward/backward direction of the vehicle 20 due to a driving operation; the backward direction correspond to the positive direction. $F_{uy}$ denotes a vector indicating the force exerted in a lateral direction of the vehicle 20 due to a driving operation; the right direction corresponds to the positive direction. $M_u$ denotes the moment (a vector quantity) exerted on the vehicle 20 due to a driving operation.

Although not illustrated in FIG. 6, $F_{Rx}$ denotes a vector indicating the force exerted in the forward/backward direction of the vehicle 20 due to the cant angle (the cross-grade) and the grade of the road surface on which the vehicle 20 runs; the backward direction corresponds to the positive direction. $F_{Ry}$ denotes a vector indicating the force exerted in the lateral direction of the vehicle 20 due to the cant angle and the grade of the road surface on which the vehicle 20 runs; right direction corresponds to the positive direction. $M_R$ denotes the moment (a vector quantity) exerted on the vehicle 20 due to the cant angle and the grade of the road surface on which the vehicle 20 runs.

Data of the cant angle and the grade of a road surface may be obtained as follows. For example, map data where cant angles and grades of road surfaces are associated with data of links (roads) may be used: the data of the cant angle and the grade corresponding to a desired link may be read to be used.

A vector and a moment (a vector quantity) indicating the force exerted on the vehicle 20 due to wind will now be expressed as follows. $F_x$ denotes a vector indicating the force exerted in the forward/backward direction as a result of the vehicle 20 receiving wind; the positive direction corresponds to the backward direction. $F_y$ denotes a vector indicating the force exerted in the lateral direction as a result of the vehicle 20 receiving wind; the positive direction corresponds to the right direction. M denotes the moment (a vector quantity) exerted on the vehicle 20 as a result of the vehicle 20 receiving wind; the counterclockwise rotation direction corresponds to the positive direction.

$F_x$, $F_y$, and M can be expressed by the following equations (4) through (6), respectively.

$$F_x = F_{Vx} - F_{ux} - F_{Rx} \tag{4}$$

$$F_y = F_{Vy} - F_{uy} - F_{Ry} \tag{5}$$

$$M = M_V - M_u - M_R \tag{6}$$

The equations (4) through (6) can be used to obtain the force $F_x$ exerted in the forward/backward direction as a result of the vehicle 20 receiving wind, the force $F_y$ exerted in the lateral direction as a result of the vehicle 20 receiving wind, and the moment M exerted as a result of the vehicle 20 receiving wind.

$F_x$ and $F_y$ can be used to estimate a wind velocity and a wind direction of wind received by the vehicle 20. An actual method for estimating a wind velocity and a wind direction from $F_x$ and $F_y$ will be described later. The moment M is used to remove vehicle information including an abnormality for a case where the abnormality such as an error is included in an acceleration a detected by the acceleration sensor 205C. Details will be described below.

Figure 7:
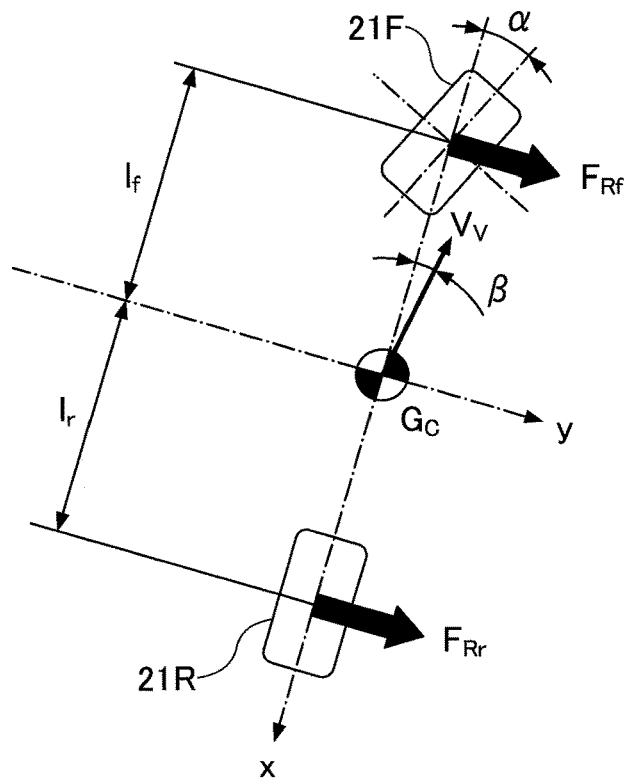
FIG. 7 is a view where a motion of a vehicle 20 is assumed as a planar motion of a rigid body and a vehicle 20 is simplified as a front-and-rear-two-wheel model.

FIG. 7 is a view where a motion of a vehicle 20 is assumed as a planar motion of a rigid body and a vehicle 20 is simplified as a front-and-rear-two-wheel model. α denotes the steering angle of the front wheel 21F. $l_f$ denotes the distance from the center of gravity $G_C$ of the vehicle 20 to the front wheel 21F. $l_r$ denotes the distance from the center of gravity $G_C$ of the vehicle 20 to the rear wheel 21R.

From the planar kinetic equations of motion, the balance of the centrifugal force, and the balance of the yaw moments in the vehicle 20, the force $F_{uy}$ exerted in the lateral direction of the vehicle 20 due to a driving operation and the moment $M_u$ exerted on the vehicle 20 due to a driving operation can be expressed by the equations (7) and (8), respectively.

$$F_{uy} = m \cdot a(V_V, \alpha) = m \cdot V_V \cdot \{A(V_V) + \delta B(V_V)/\delta t\} \cdot \alpha \quad (7)$$

$$M_u = I \cdot \delta A(V_V)/\delta t \cdot \alpha \quad (8)$$

There, the lateral acceleration $a(V_V, \alpha)$ of the vehicle 20 is expressed by $$a(V_V, \alpha) = V_V \cdot \{A(V_V) + \delta B(V_V)/\delta t\} \cdot \alpha$$

as a function of the vehicle velocity $V_V$ and the steering angle α, where the vehicle velocity $V_V$ is a vector.

The functions $A(V_V)$ and $B(V_V)$ of the vehicle velocity $V_V$ are expressed by:

$$A(V_V) = V_V / \{l - m \cdot V_V^2 \cdot (l_f \cdot C_{Pf} - l_r \cdot C_{Pr})/2 \cdot L \cdot C_{Pf} \cdot C_{Pr}\}$$

$$B(V_V) = (l_r \cdot C_{Pr} - m \cdot l_f \cdot V_V^2/2 \cdot L)/\{L \cdot C_{Pr} - m \cdot (l_f C_{Pf} - l_r \cdot C_{Pr}) \cdot V_V/2 \cdot L \cdot C_{Pf}\}$$

There, $C_{Pf}$ and $C_{Pr}$ denote the cornering power of the front wheel and the cornering power of the rear wheel, respectively; $L = l_f + l_r$.

The vehicle velocity $V_V$ is a vector of the direction at the vehicle side slip angle β. Because the vehicle side slip angle β can be regarded as zero, the vehicle velocity $V_V$ can be treated as a velocity (a scalar quantity) in the traveling direction of the vehicle 20.

Where $P_A$ denotes the accelerator position (the accelerator pedal operation amount) and $P_B$ denotes the brake operation amount (brake pedal operation amount), the force $F_{ux}$ exerted in the forward/backward direction of the vehicle 20 due to a driving operation of the vehicle 20 can be expressed as a function of the following equation (9).

$$F_{ux} = C(P_A, P_B, V_V, G) \quad (9)$$

The function $C(P_A, P_B, V_V, G)$ is a function that derives the force $F_{ux}$ from the accelerator position $P_A$, the brake operation amount $P_B$, the vehicle velocity $V_V$, and the total gear ratio of transmission G. Such a function may be determined as a function expressing the average response of the vehicle 20 with respect to an accelerator position $P_A$ and a brake operation amount $P_B$. The average response may be obtained, for example, by using data obtained during development of vehicles 20 or by using a result obtained from an analysis of big data of vehicle information collected from a plurality of vehicles 20 by the center 10.

The acceleration obtained from dividing $C(P_A, P_B, V_V, G)$ of the equation (9) by the mass m of the vehicle 20 (the acceleration of the vehicle 20 in the forward/backward direction due to a driving operation) and the acceleration $a(V_V, \alpha)$ included in the equations (7) (the acceleration of the vehicle 20 in the lateral direction due to a driving operation) are one example of a second acceleration.

Figure 8A:
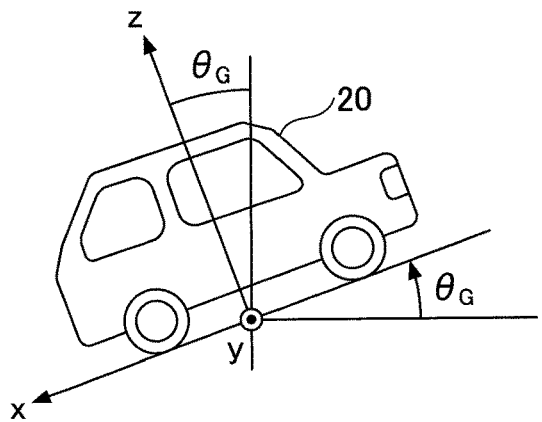
FIGS. 8A and 8B illustrate a vehicle 20 traveling on a road ST.
Figure 8B:
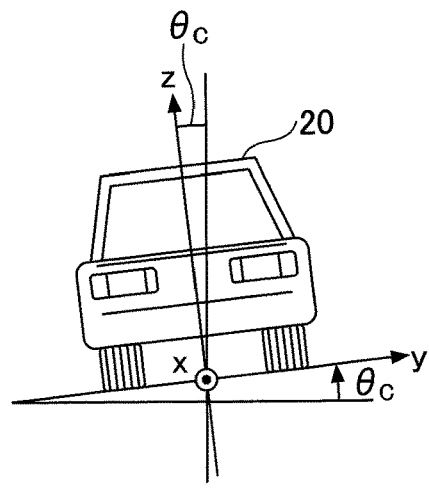

FIGS. 8A and 8B illustrate a vehicle 20 traveling on a road ST.

Concerning a road surface grade angle $\theta_G$, the positive direction corresponds to the counterclockwise direction (a direction in which a vehicle 20 climbs) in view of the vehicle 20 from the right side. That is, as illustrated in FIG. 8A, when the vehicle 20 is viewed from the right side, a road surface grade angle $\theta_G$ denotes the angle between the vertical direction and the z-axis and denotes the angle between the horizontal direction and the x-axis. Concerning a road surface cant angle $\theta_C$, the counterclockwise direction when the vehicle 20 is viewed from the rear side corresponds to the positive direction. That is, as illustrated in FIG. 8B, a road surface cant angle $\theta_C$ denotes the angle between the vertical direction and the z-axis when the vehicle 20 is viewed from the rear side and denotes the angle between the horizontal direction and the y-axis. The xyz coordinate system including the z-axis based on the vehicle 20 is a right-handed coordinate system.

By using a road surface grade angle $\theta_G$ and a road surface cant angle $\theta_0$, the forces $F_{Rx}$ and $F_{Ry}$ exerted in the forward/backward direction and the lateral direction of the vehicle 20 due to the cant angle and the grade of the road surface on which the vehicle 20 runs and the moment $M_R$ exerted on the vehicle 20 due to the cant angle and the grade of the road surface on which the vehicle 20 runs are expressed by the following equations (10) through (12).

In the equation (12), $F_{Rf}$ (see FIG. 7) denotes the lateral force exerted on the front tire 21F due to the road surface cant; $F_{Rr}$ (see FIG. 7) denotes the lateral force exerted on the rear tire 21R due to the road surface cant.

$$F_{Rx} = m \cdot g \cdot \sin \theta_G \quad (10)$$

$$F_{Ry} = m \cdot g \cdot \sin \theta_C \quad (11)$$

$$M_R = I \cdot \delta \omega / \delta t = l_f F_{Rf} - l_r \cdot F_{Rr} \quad (12)$$

The accelerations $g \cdot \sin \theta_G$ and $g \cdot \sin \theta_C$ included in the equations (10) and (11) denote accelerations of the vehicle 20 due to the road surface grade and the road surface cant and are one example of a third acceleration.

Figure 9:
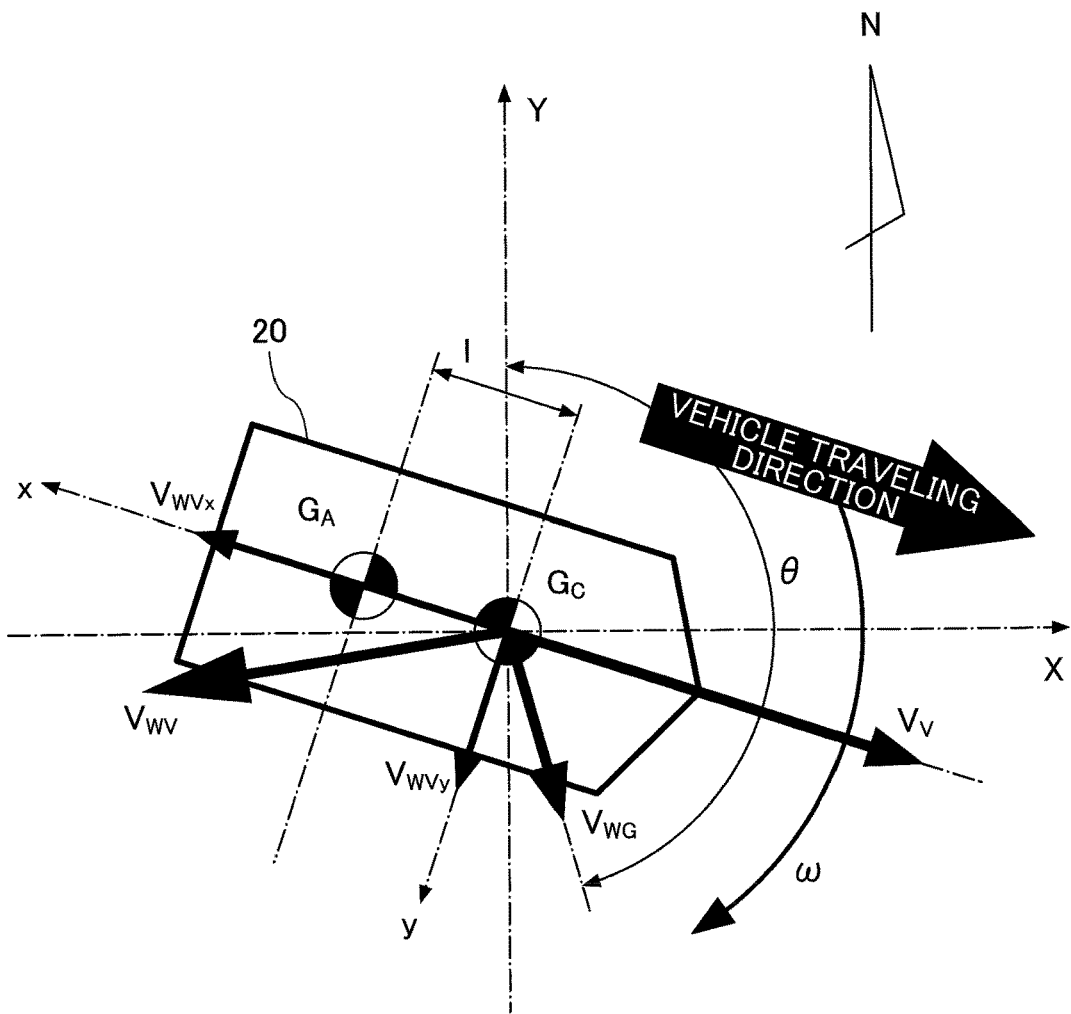
FIG. 9 illustrates a vector of wind received by a vehicle 20.

FIG. 9 illustrates a vector of wind received by a vehicle 20. The ground coordinate system including the road surface on which the vehicle 20 runs is indicated by an uppercase XY coordinate system. The X-axis corresponds to the east-west direction; the east direction corresponds to the positive direction. The Y-axis corresponds to the north-south direction; the north direction corresponds to the positive direction.

$V_{WG}$ denotes the ground-basis wind velocity (a vector) and has the wind velocity (a scalar quantity) indicated according to the ground coordinate system (the XY coordinate system of uppercase letters). A wind direction is indicated by the angle θ of the clockwise direction with respect to the Y-axis positive direction (the north direction). $V_{WV}$ denotes the vehicle-basis wind velocity (a vector) and has the wind velocity (a scalar quantity) indicated according to the coordinate system (the xy coordinate system) of the vehicle 20. $V_{WVx}$ denotes the x-axis component of the vehicle-basis wind velocity; $V_{WVy}$ denotes the y-axis component of the vehicle-basis wind velocity.

It will now be assumed that the air density is $\rho$ (kg/m³), the front projected area of a vehicle 20 is $S_F$ (m²), the side projected area of the vehicle 20 is $S_S$ (m²), the front air resistance coefficient of the vehicle 20 is $C_{DF}$, the side air resistance coefficient of the vehicle 20 is $C_{DS}$, and the distance from the center of the lateral force received by the vehicle 20 due to the wind from the lateral direction to the center of gravity of the vehicle 20 is l (m). In this regard, $l \neq l_f + l_r$, and l denotes the distance between the center of gravity Gc of the vehicle 20 and the aerodynamic yawing center $G_A$ in plan view (the distance along the centerline of the vehicle 20).

For example, values of the vehicle specifications of the vehicle 20 may be used for the front projected area $S_F$ (m²), the side projected area $S_S$(m²), the front air resistance coefficient $C_{DF}$, the side air resistance coefficient $C_{DS}$, and the distance l(m) from the center of the lateral force to the center of gravity of the vehicle 20 received by the vehicle 20 due to the wind from the lateral direction. As the air density $\rho$, the value in normal conditions may be used, for example, or a value obtained from correcting the value in normal conditions by the atmospheric temperature and/or the atmospheric pressure may be used, for example. The value of the atmospheric pressure may be obtained by converting the value of the altitude included in navigation map data.

$F_x$, $F_y$, and M included in the above-mentioned equations (4) through (6), respectively, can be expressed by the following equations (13) through (15) using the above-described vehicle specifications, or the like.

$$F_x = \tfrac{1}{2} \cdot \rho \cdot V_{WVx}^2 \cdot S_F \cdot C_{DF} \tag{13}$$

$$F_y = \tfrac{1}{2} \cdot \rho \cdot V_{WVy}^2 \cdot S_S \cdot C_{DS} \tag{14}$$

$$M = \tfrac{1}{2} \cdot \rho \cdot V_{WVy}^2 \cdot S_S \cdot C_{Ds} \cdot l \tag{15}$$

From the equations (13) and (14), the x-axis component $V_{WVx}$ and the y-axis component $V_{WVy}$ of the vehicle-basis wind velocity can be expressed by the equations (16) and (17).

$$V_{WVx} = \sqrt{2 \cdot F_x / (\rho \cdot S_F \cdot C_{DF})} \tag{16}$$

$$V_{WVy} = \sqrt{2 \cdot F_y / (\rho \cdot S_S \cdot C_{DS})} \tag{17}$$

That is, the force $F_x$ exerted in the forward/backward direction as a result of the vehicle 20 receiving wind and the force $F_y$ exerted in the lateral direction as a result of the vehicle 20 receiving wind can be converted to the x-axis component $V_{WVx}$ and the y-axis component $V_{WVy}$ of the vehicle-basis wind velocity.

Next, the ground-basis wind velocity $V_{WG}$ is calculated from the x-axis component $V_{WVx}$ and the y-axis component $V_{WVy}$ of a vehicle-basis wind velocity expressed by the equations (16) and (17). The vector of the ground-basis wind velocity $V_{WG}$ can be expressed by the following equation (18) as the sum of the vector of the vehicle velocity $V_V$ and the vector of the vehicle-basis wind velocity $V_{WV}$. $V_{VX}$ denotes the x-axis component of a vehicle velocity $V_V$; $V_{VY}$ denotes the Y-axis component of a vehicle velocity $V_V$.

$$\vec{V_{WG}} = \vec{V_V} + \vec{V_{WV}} = (V_{VX} + V_{WVx}, V_{VY} + V_{WVy}) \tag{18}$$

From the equation (18), the ground-basis wind velocity $V_{WG}$ and the wind direction $\theta$ can be expressed by the equations (19) and (20), respectively.

$$V_{WG} = \sqrt{(V_{VX} + V_{WVx})^2 + (V_{VY} + V_{WVy})^2} \tag{19}$$
$$= \sqrt{(V_{WVx} - V_V)^2 + V_{WVy}^2}$$

$$\left. \begin{array}{l} \theta = \tan^{-1}((V_{VX} + V_{WVx})/(V_{VY} + V_{WVy})) \\ \quad \text{(where } V_{VX} + V_{WVx} \geq 0) \\ \text{or } \theta = \pi + \tan^{-1}((V_{VX} + V_{WVx})/(V_{VY} + V_{WVy})) \\ \quad \text{(where } V_{VX} + V_{WVx} < 0) \end{array} \right\} \tag{20}$$

The center 10 collects vehicle information from a plurality of vehicles 20. For this purpose, the information collecting unit 120 of the wind data estimating apparatus 100 obtains vehicle information including data indicating accelerator positions, vehicle velocities, accelerations, steering angles, yaw rates, brake operation amounts, and positions from the vehicles 20 at a predetermined sampling rate. The information classifying unit 130 collects position information and time information indicating the positions and times at which the accelerations and the yaw rates are obtained. The estimating unit 140 performs the following processing.

The estimating unit 140 obtains the ground-basis wind velocities $V_{WGi}$ and the wind directions $\theta_i$ of the winds received by n vehicles running simultaneously in the same area where the vehicle 20 is running. n denotes the number of vehicles running simultaneously at the predetermined area for which the ground-basis wind velocities $V_{WG}$ and the wind directions $\theta$ are obtained; i is a number (an integer indicating an i-th vehicle) between 1 and n.

Average values $V_{WGm}$ and $\theta_m$ of the ground-basis wind velocities $V_{WGi}$ and wind directions $\theta_i$ for the n vehicles can be expressed by the following equations (21) and (22).

$$V_{WGm} = 1/n \cdot \Sigma V_{WGi} \tag{21}$$

$$\theta_m = 1/n \cdot \Sigma \theta_i \tag{22}$$

The sample standard deviations Sv and S$\theta$ of the average values $V_{WGm}$ and $\theta_m$ of the ground-basis wind velocities and wind directions can be expressed by the following equations (23) and (24).

$$S_V = \sqrt{1/n \cdot \Sigma(V_{WGi} - V_{WGm})^2} \tag{23}$$

$$S_\theta = \sqrt{1/n \cdot \Sigma(\theta_i - \theta_m)^2} \tag{24}$$

Thus, the estimating unit 140 can obtain the average values $V_{WGm}$ and $\theta_m$ of the ground-basis wind velocities and the wind directions as well as the sample standard deviations Sv and S$\theta$.

Thus, the vector of the vehicle-basis wind velocity V of the wind received by a single vehicle 20 can be obtained on the basis of the force $F_{Vx}$ and $F_{Vy}$ exerted in the forward/backward direction and the lateral direction of the vehicle 20, the force $F_{ux}$ and $F_{uy}$ exerted in the forward/backward direction and the lateral direction of the vehicle 20 due to a driving operation, and the force $F_{Rx}$ and $F_{Ry}$ exerted in the forward/backward direction and the lateral direction of the vehicle 20 due to the cant angle and the grade of the road surface on which the vehicle 20 runs. Further, by using the vehicle velocity $V_V$, it is possible to obtain the ground-basis wind velocity $V_{WG}$ and the wind direction $\theta$.

Then, the average values $V_{WGm}$ and $\theta_m$ of the ground-basis wind velocities $V_{WG}$ and the wind directions $\theta$ of a plurality of vehicles running in the same area during the same time range can be calculated as the wind velocity and the wind direction for the area and for the time range.

In order to eliminate vehicle information that includes an acceleration a including abnormality such as an error by using a moment M, the following procedure may be performed. For example, when the lateral acceleration of a vehicle 20 is zero and the absolute value of the yaw rate $\omega$ of the vehicle 20 not due to the driver's operation is greater than zero ($|\omega|>0$), the corresponding data may be determined as vehicle data concerning an acceleration sensor failure and may be excluded from being used for statistical processing.

The moment $M_R$ exerted on a vehicle 20 due to the cant angle and the grade of the road surface can be determined as $M_R=0$ in the equation (12) because $f \cdot F_{Rf} \approx l_r \cdot F_{Rr}$ can be considered to be true.

Figure 10:
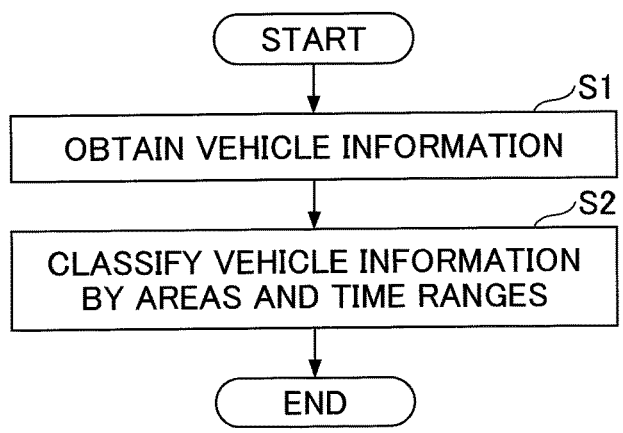
FIG. 10 is a flowchart illustrating a process performed by the wind data estimating apparatus 100.

FIG. 10 is a flowchart illustrating a process performed by the wind data estimating apparatus 100.

After the process is started, the information collecting unit 120 obtains vehicle information from vehicles 20 (step S1).

In step S2, the information classifying unit 130 classifies the vehicle information of the vehicles 20 obtained by the information collecting unit 120 by predetermined areas, further classifies the vehicle information by time ranges, and stores the classified vehicle information in a vehicle information database. Thus, a vehicle information database such as the vehicle information database illustrated in FIGS. 5A and 5B is obtained.

The wind data estimating apparatus 100 repeatedly performs steps S1 and S2.

Figure 11:
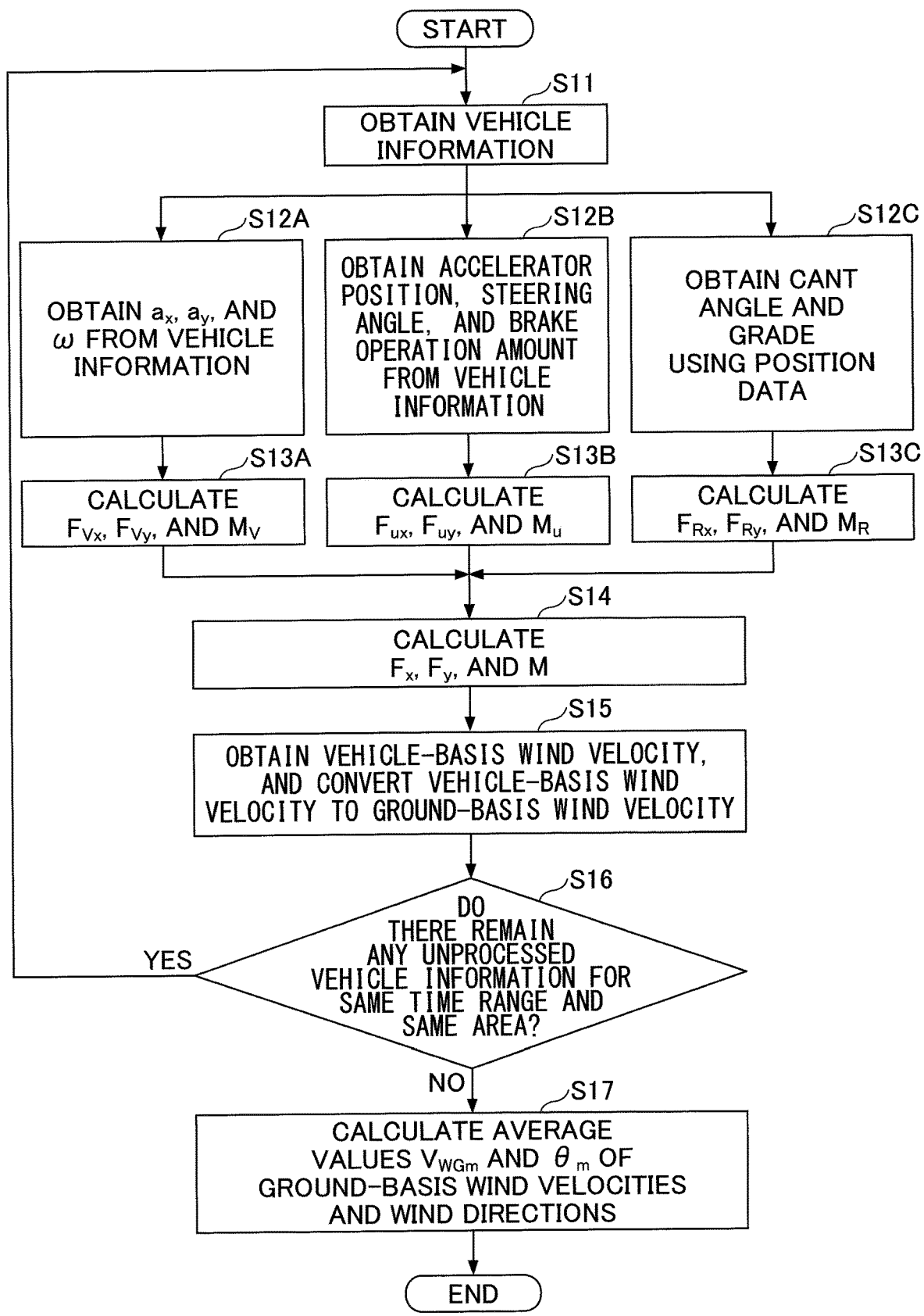
FIG. 11 is a flowchart illustrating a process performed by the wind data estimating apparatus 100.

FIG. 11 illustrates a flowchart illustrating a process performed by the wind data estimating apparatus 100.

After the process is started, the estimating unit 140 selects one set of vehicle information classified by a predetermined area and a predetermined time range from the vehicle information database (step S11). For a predetermined area, the code of a corresponding area may be selected, one by one, in the ascending order from 1. A predetermined time range may be selected in the order starting from the earliest for each of the thus selected areas.

Next, the estimating unit 140 executes steps S12A, S12B, and S12C in parallel and executes steps S13A, S13B, and S13C in parallel. Details are as follows.

In step S12A, the estimating unit 140 reads the forward/backward acceleration $a_x$, the lateral acceleration $a_y$, and the yaw rate $\omega$ from the selected set of vehicle information.

In step S12B, the estimating unit 140 reads the accelerator position, the steering angle, and the brake operation amount from the set of vehicle information.

In step S12C, the estimating unit 140 reads the position data included in the set of vehicle information and reads the cant angle and grade associated with the link corresponding to the read position data in the electronic map (i.e., the map data).

In step S13A, the estimating unit 140 calculates $F_{Vx}$, $F_{Vy}$, and $M_V$ using the equations (1) through (3).

In step S13B, the estimating unit 140 calculates $F_{ux}$, $F_{uy}$, and $M_u$ using the equations (9), (7), and (8).

In step S13C, the estimating unit 140 calculates $F_{Rx}$, $F_{Ry}$, and $M_R$ using the equation (10) through (12).

In step S14, the estimating unit 140 calculates $F_x$, $F_y$, and M using the equations (4) through (6).

In step S15, the estimating unit 140 obtains the vehicle-basis wind velocity $V_{WV}$ using the equations (16) and (17), thereafter converts the vehicle-basis wind velocity $V_{WV}$ to the ground-basis wind velocity $V_{WG}$ using the equations (18), (19), and (20), and thus calculates the ground-basis wind velocity $V_{WG}$ and the wind direction $\theta$.

In step S16, the estimating unit 140 determines whether there remain unprocessed sets of vehicle information for which ground-basis wind velocities $V_{WG}$ and wind directions $\theta$ have not been calculated yet for the same time range and the same area. The process of step S16 is performed by determining by the estimating unit 140 whether unprocessed sets of vehicle information remain in the vehicle information database for the same time and the same area.

When it is determined that there remain unprocessed sets of vehicle information (S16: YES), the estimating unit 140 returns to step S11 and repeatedly executes steps S11 through S16 for the unprocessed sets of vehicle information.

When it is determined that there remain no unprocessed sets of vehicle information (S16: NO), the estimating unit 140 calculates, using the equations (21) and (22), the average values $V_{WGm}$ and $\theta_m$ of all of the ground-basis wind velocities $V_{WG}$ and wind directions $\theta$ calculated in step S15 (step S17).

After the completion of step S17, the estimating unit 140 ends the process of FIG. 11.

The wind data estimating apparatus 100 performs a process illustrated in FIG. 11 for all of the time ranges and all of the areas included in the vehicle information database to calculate respective sets of average values $V_{WGm}$ and $\theta_m$ of ground-basis wind velocities $V_{WG}$ and wind directions $\theta$.

In this regard, average values $V_{WGm}$ and $\theta_m$ for which the sample standard deviations Sv and S$\theta$ are equal to or less than a predetermined threshold value may be stored in a wind database, whereas, for average values $V_{WGm}$ and $\theta_m$ for which the sample standard deviations Sv are greater than the predetermined threshold value, new average values $V_{WGm}$ and $\theta_m$ obtained after increasing the number of samples by increasing the size of the area until the sample standard deviations Sv and S$\theta$ become equal to or less than the predetermined threshold value may be stored in the wind database; or the original average values $V_{WGm}$ and $\theta_m$ may be stored in the wind database as they are leaving the size of the area unchanged together with flags indicating that the reliability of the estimated crosswind values is not high (or the variation is great).

Figure 12:
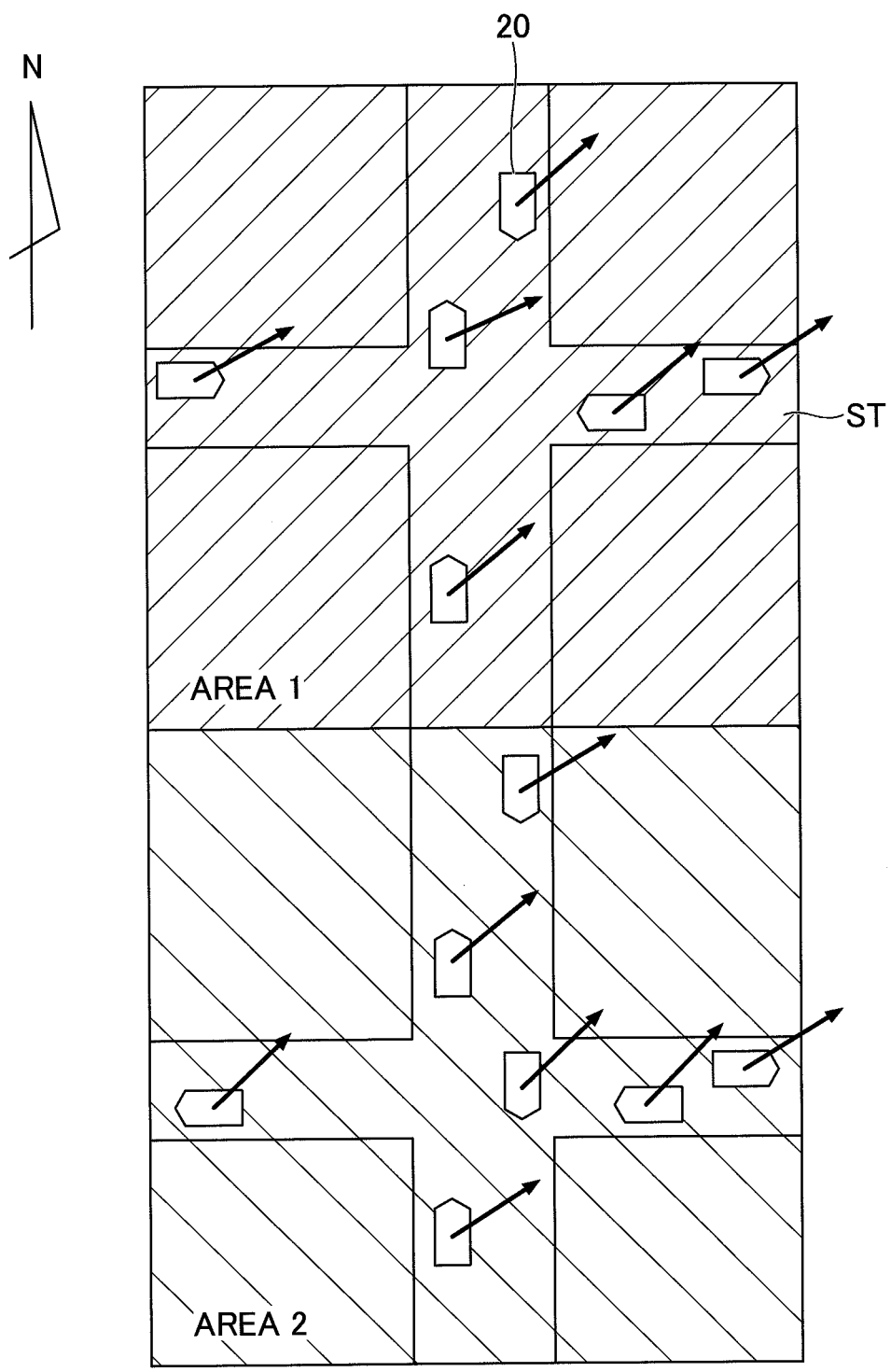
FIG. 12 illustrates vehicles 20 and wind directions in mesh-like areas 1 and 2.

FIG. 12 illustrates vehicles 20 and wind directions in mesh-like areas 1 and 2. The areas 1 and 2 are areas adjacent to one another in the north and south directions, and there are roads ST extending in the north, east, west, and south directions. Within the area 1, 6 vehicles 20 run on roads ST; within area 2, 7 vehicles 20 run on roads ST. As indicated by arrows, southwest winds blow, and the vehicles 20 receive force in northeast directions accordingly.

The wind data estimating apparatus 100 can obtain average values $V_{WGm}$ and $\theta_m$ of ground-basis wind velocities and wind directions and obtain the sample standard deviations Sv and Sθ for each of the areas 1 and 2. The average values $V_{WGm}$ and $\theta_m$ of ground-basis wind velocities and wind directions are estimates.

FIG. 13 illustrates a wind database calculated by the wind data estimating apparatus 100. The wind database stores average values $V_{WGm}$ and $\theta_m$ of ground-basis wind velocities and wind directions calculated by the wind data estimating apparatus 100. The wind database is associated with areas and time ranges and is stored in the memory 160.

The data thus stored in the wind database may be, for example, distributed from the communication unit 150 to vehicles 20 and displayed on display panels of navigation systems of the vehicles, or used to display a message to alert to a strong wind, a gust, a tornado, or the like.

Settings of the VSC-ECUs 204B of vehicles 20 may be adjusted according to crosswind velocities. When vehicles 20 include ECUs (steering assist ECUs) for assisting steering, the amounts of steering assist by the steering assist ECUs may be adjusted according to the crosswind velocities included in the wind database.

In addition, for example, for a case where vehicles 20 are self-driving cars, the data stored in the wind database may be used to correct amounts of driving operations, such as a steering operations, brake operations, accelerator operations, and so forth. Self-driving means self-driving of a predetermined level prescribed by the Ministry of Land, Infrastructure, Transport and Tourism, the Society of Automotive Engineers (SAE), or the like.

Furthermore, for example, by incorporating data of a wind database into a dynamic map, it is possible to provide a more accurate dynamic map including more information. For example, when the center 10 performs a route search, the center 10 may search for a route that bypasses a point where the wind velocity is greater than a predetermined velocity.

Thus, according to the embodiment, the wind data estimating apparatus 100 can be provided that can estimate data about wind received by a vehicle. Furthermore, by creating a dynamic map associated with a wind database, it is possible to use the dynamic map for various purposes such as alert display, control of a vehicle 20, route search, and so forth.

Thus, the configuration where the wind data estimating apparatus 100 of the center 10 calculates a vehicle-basis wind velocity $V_{WV}$ has been described. However, an ECU of a vehicle 20 may calculate and transmit a vehicle-basis wind velocity V to the wind data estimating apparatus 100 through the DCM 203. In such a case, the wind data estimating apparatus 100 may obtain the average value of the vehicle-basis wind velocities $V_{WV}$ received from a plurality of vehicles 20.

Furthermore, the configuration has been described where force $F_{Vx}$ exerted in a forward/backward direction of a vehicle 20 due to a driving operation and force $F_{Rx}$ exerted in a forward/backward direction of the vehicle 20 due to the cant angle and the grade of the road surface on which the vehicle 20 runs are subtracted from force $F_{Vx}$ exerted in a forward/backward direction of the vehicle 20, whereby force $F_x$ exerted in a forward/backward direction of the vehicle 20 as a result of the vehicle 20 receiving wind is obtained.

In addition, the configuration has been described where force $F_{Vy}$ exerted in a lateral direction of a vehicle 20 due to a driving operation and force $F_{Ry}$ exerted in a lateral direction of the vehicle 20 due to the cant angle and the grade of the road surface on which the vehicle 20 runs are subtracted from force $F_{Vy}$ exerted in a lateral direction of the vehicle 20, whereby force $F_y$ exerted in a lateral direction of the vehicle 20 as a result of the vehicle 20 receiving wind is obtained.

However, force $F_{Vx}$ exerted in a forward/backward direction of a vehicle and force $F_{Vy}$ exerted in a lateral direction of the vehicle 20 may be obtained without subtraction of force $F_{Rx}$ exerted in a forward/backward direction of the vehicle 20 and force $F_{Ry}$ exerted in a lateral direction of the vehicle 20 due to the cant angle and grade of the road surface on which the vehicle 20 runs. Especially for a case where force $F_{Rx}$ exerted in a forward/backward direction of a vehicle 20 and force $F_{Ry}$ exerted in a lateral direction of the vehicle 20 due to the cant angle and grade of the road surface on which the vehicle 20 runs are small, the calculation amount can be reduced by omitting subtraction of the force $F_{Rx}$ and $F_{Ry}$ as mentioned above.

In addition, a wind velocity and a wind direction may be estimated taking into account of only one of the cant angle and the grade of a road surface.

In addition, the configuration where force $F_{ux}$ and $F_{uy}$ exerted in a forward/backward direction and a lateral direction of a vehicle 20 due to a driving operation is obtained using the accelerator position, the brake operation amount, the vehicle velocity, and the steering angle has been described. In this regard, accelerations of a vehicle 20 occurring due to a driving operation may be obtained using at least one of the accelerator position, the brake operation amount, the vehicle velocity, and the steering angle.

Thus, the wind data estimation apparatus of the exemplary embodiment of the present invention has been described. In this regard, the present invention is not limited to the specifically disclosed embodiment, and variations and modifications can be made without departing from the scope of the claims.

DESCRIPTION OF REFERENCE NUMERALS 1 wind data estimating system
10 center
20 vehicle
100 wind data estimating apparatus
110 main control unit
120 information collecting unit
130 information classifying unit
140 estimating unit
150 communication unit
160 memory The present application is based on and claims priority to Japanese patent application No. 2018-131837, filed on Jul. 11, 2018, the entire contents of which are hereby incorporated herein by reference.

What is claimed is:

1. A wind data estimating apparatus comprising:
one or more processors configured to
collect vehicle information including a first acceleration, an amount of driving operation performed by a driver of a vehicle, and position information, which are detected by sensors installed in the vehicle;
classify the collected vehicle information by an area of a plurality of mesh-like areas according to the position information; and
estimate a wind velocity and a wind direction for the area and for a time range when the vehicle information is obtained, on the basis of an acceleration obtained from subtracting a second acceleration caused by the amount of driving operation from the first acceleration included in the vehicle information classified by the area; and a memory configured to
store a wind database with respect to an estimated wind velocity and an estimated wind direction on a per area basis and per time range basis, each of the estimated wind velocity and the estimated wind direction being an average with respect to a plurality of vehicles that are associated with a corresponding area and a corresponding time range,
wherein averages of a plurality of wind velocities and a plurality of wind directions for which sample standard deviations are equal to or less than predetermined threshold values are stored in the wind database, and wherein
for the averages of the plurality of wind velocities and the plurality of wind directions for which the sample standard deviations are greater than the predetermined threshold values,
new averages of the plurality of wind velocities and the plurality of wind directions obtained after increasing the number of samples by increasing a size of the area until the sample standard deviations become equal to or less than the predetermined threshold values are stored in the wind database, or
the averages of the plurality of wind velocities and the plurality of wind directions are stored in the wind database as they are, leaving the size of the area unchanged together with flags indicating that reliability is not high.

2. The wind data estimating apparatus according to claim 1, wherein
the amount of driving operation performed by the driver of the vehicle includes an accelerator position, a brake operation amount, a vehicle velocity, or a steering angle detected by a corresponding sensor of the sensors installed in the vehicle.

3. The wind data estimating apparatus according to claim 2, wherein
the one or more processors are configured to obtain, from the estimated wind velocity and wind direction and the vehicle velocity of the vehicle, a wind velocity and a wind direction in a ground coordinate system with respect to a traveling direction of the vehicle.

4. The wind data estimating apparatus according to claim 2, wherein
the one or more processors are configured to estimate the wind velocity and the wind direction of the area and the time range on the basis of an acceleration obtained from subtracting, from the first acceleration, the second acceleration and a third acceleration of the vehicle caused by a cross-grade or a grade of a road corresponding to the position information.

5. The wind data estimating apparatus according to claim 4, wherein
the one or more processors are configured to obtain, from the estimated wind velocity and wind direction and the vehicle velocity of the vehicle, a wind velocity and a wind direction in a ground coordinate system with respect to a traveling direction of the vehicle.

6. The wind data estimation apparatus according to claim 2, wherein
the one or more processors are configured to
collect respective sets of vehicle information from a plurality of vehicles;
classify the collected sets of vehicle information by respective areas from among the plurality of mesh-like areas in accordance with corresponding sets of position information; and
estimate the wind velocity and the wind direction of the area on the basis of a plurality of wind velocities and a plurality of wind directions estimated from corresponding sets of vehicle information obtained during a same time range from among a plurality of sets of vehicle information classified by a same area.

7. The wind data estimating apparatus according to claim 6, wherein
the one or more processors are configured to obtain, from the estimated wind velocity and wind direction and the vehicle velocity of the vehicle, a wind velocity and a wind direction in a ground coordinate system with respect to a traveling direction of the vehicle.

8. The wind data estimating apparatus according to claim 6, wherein
the one or more processors are configured to estimate the plurality of wind velocities and the plurality of wind directions from the corresponding sets of vehicle information of the same area and the same time range, on the basis of accelerations obtained from subtracting, from first accelerations, second accelerations and third accelerations that occur in the vehicles due to cross-grades or grades of roads associated with corresponding sets of position information, respectively.

9. The wind data estimating apparatus according to claim 8, wherein
the one or more processors are configured to obtain, from the estimated wind velocity and wind direction and the vehicle velocity of the vehicle, a wind velocity and a wind direction in a ground coordinate system with respect to a traveling direction of the vehicle.

10. The wind data estimating apparatus according to claim 1, wherein
the one or more processors are configured to estimate the wind velocity and the wind direction of the area and the time range on the basis of an acceleration obtained from subtracting, from the first acceleration, the second acceleration and a third acceleration of the vehicle caused by a cross-grade or a grade of a road corresponding to the position information.

11. The wind data estimating apparatus according to claim 10, wherein
the one or more processors are configured to obtain, from the estimated wind velocity and wind direction and a vehicle velocity of the vehicle, a wind velocity and a wind direction in a ground coordinate system with respect to a traveling direction of the vehicle.

12. The wind data estimation apparatus according to claim 1, wherein
the one or more processors are configured to
collect respective sets of vehicle information from a plurality of vehicles;
classify the collected sets of vehicle information by respective areas from among the plurality of mesh-like areas in accordance with corresponding sets of position information; and
estimate the wind velocity and the wind direction of the area on the basis of a plurality of wind velocities and a plurality of wind directions estimated from corresponding sets of vehicle information obtained during a same time range from among a plurality of sets of vehicle information classified by a same area.

13. The wind data estimating apparatus according to claim 12, wherein
the one or more processors are configured to obtain, from the estimated wind velocity and wind direction and a vehicle velocity of the vehicle, a wind velocity and a wind direction in a ground coordinate system with respect to a traveling direction of the vehicle.

14. The wind data estimating apparatus according to claim 12, wherein
the one or more processors are configured to estimate the plurality of wind velocities and the plurality of wind directions from the corresponding sets of vehicle information of the same area and the same time range, on the basis of accelerations obtained from subtracting, from first accelerations, second accelerations and third accelerations that occur in the vehicles due to cross-grades or grades of roads associated with corresponding sets of position information, respectively.

15. The wind data estimating apparatus according to claim 14, wherein
the one or more processors are configured to obtain, from the estimated wind velocity and wind direction and a vehicle velocity of the vehicle, a wind velocity and a wind direction in a ground coordinate system with respect to a traveling direction of the vehicle.

16. The wind data estimating apparatus according to claim 1, wherein
the one or more processors are configured to obtain, from the estimated wind velocity and wind direction and a vehicle velocity of the vehicle, a wind velocity and a wind direction in a ground coordinate system with respect to a traveling direction of the vehicle.

* * * * *